Jan. 12, 1954  R. J. SLEZAK  2,665,731
TUBELESS TIRE
Filed Dec. 6, 1951

INVENTOR.
RAYMOND J. SLEZAK
BY
ATTYS-

Patented Jan. 12, 1954

2,665,731

UNITED STATES PATENT OFFICE 2,665,731

TUBELESS TIRE

Raymond J. Slezak, Akron, Ohio, assignor to The Firestone Tire & Rubber Company, Akron, Ohio, a corporation of Ohio Application December 6, 1951, Serial No. 260,196

4 Claims. (Cl. 152—341)

This invention relates to tires, of the type known as tubeless tires, which have safety diaphragms substituted for blowout-safe inner tubes, and relates more particularly to an improved valve construction for such diaphragms.

The so-called tubeless tires are inflated by introducing air into the chamber defined by the tire casing and rim upon which it is mounted, the air pressure being maintained by means of a tight seal between the bead portion of the tire and rim. In the absence of a diaphragm, air is introduced into the tire without difficulty by means of an inflating valve mounted in the rim.

However, in some cases, it has been found desirable to provide an auxiliary or safety diaphragm to give protection against blowouts, the diaphragm dividing the tire into two chambers, an outer chamber between the tire and the diaphragm and an inner chamber between the diaphragm and the rim, so that when a blowout occurs, the diaphragm will retain air within the inner chamber to support the car until it can be brought safely to a stop. The use of such safety diaphragms, however, introduces difficulties in inflating the tire, for communication must be provided between the two chambers when the tire is being inflated but must be cut-off when a blowout occurs. In some cases "slow-leak" valves in the form of apertures of predetermined size have been tried, but these are inconvenient because the rate of inflation must necessarily be very slow in order to permit air to pass into the outer chamber. In other cases, check valves have been used, but these are also unduly sensitive to the rate of inflation, and accordingly, inflation must proceed at a slow rate.

The present invention avoids these difficulties by providing a novel valve construction having an operation which depends not upon the rate at which air passes through it from one chamber to another, but upon a radical change in shape of the diaphragm when the air pressure in the outer chamber suddenly drops. When the tire is inflated, air will readily pass through the valve, for at this time there is no substantial difference in pressure between the two chambers. In contrast, when a blowout occurs, the pressure in the outer chamber almost instantly becomes atmospheric while that in the inner chamber remains substantially at inflation pressure. The difference in pressure causes the diaphragm to change its shape radially in a manner to close the valve. The valve is simple in construction, comprising a hole in a portion of the diaphragm which has a relatively sharp curvature and a flat strip of material overlying the hole and secured at its ends to the diaphragm. The strip is preferably shorter in length than the spacing along the diaphragm of its points of attachment to the diaphragm so that in its normal position it spans the portion of sharp curvature and is spaced a considerable distance therefrom, permitting air to pass between the strip and the diaphragm and through the hole with relative freedom. However, when a blowout occurs, the sudden release of pressure in the outer chamber will cause the diaphragm to distend outwardly, stretching the sharply curved portion to a shape of slight curvature and simultaneously stretching the strip, pulling it close to the diaphragm to close off the hole and prevent further passage of air therethrough.

The invention is especially useful with a diaphragm of the depressed crown type. In this form of diaphragm the crown is depressed to assume a reverse curvature and, as a result, the shoulders on each side of the crown are of rather sharp curvature. It is at these shoulders that the valve is advantageously located. When a blowout occurs, the recessed crown snaps out in a manner to eliminate the shoulders, enabling the strip to lie close to the diaphragm and seal off communication between the inner and outer chambers of the tire.

The general object of the invention, therefore, is to provide a tubeless tire, flexible diaphragm comprising a valve construction which is normally open and which is operated by a severe distortion of the diaphragm to close the valve.

Another object is to provide a valve for the diaphragm of a tubeless tire in which the air may pass freely through while the tire is being inflated but which will close immediately when the tire blows out.

Another object is to provide a valve for the diaphragm of tubeless tires in which the diaphragm is of the recessed crown type and in which the valve comprises a strip overlying an apertured shoulder portion of sharp curvature which, when the air pressure on the outer side of the diaphragm drops suddenly to atmospheric pressure, undergoes a severe, local distention at the shoulder to pull the strip into sealing proximity to the apertured portion.

Other objects are to provide a valve construction which is simple and economical to manufacture, which is rugged and effective, and which avoids the difficulties of the prior art.

Further objects and advantages will more fully appear from the following description of a preferred form of the invention, reference being had to the accompanying drawings in which.

Figures 1, 2, 3:
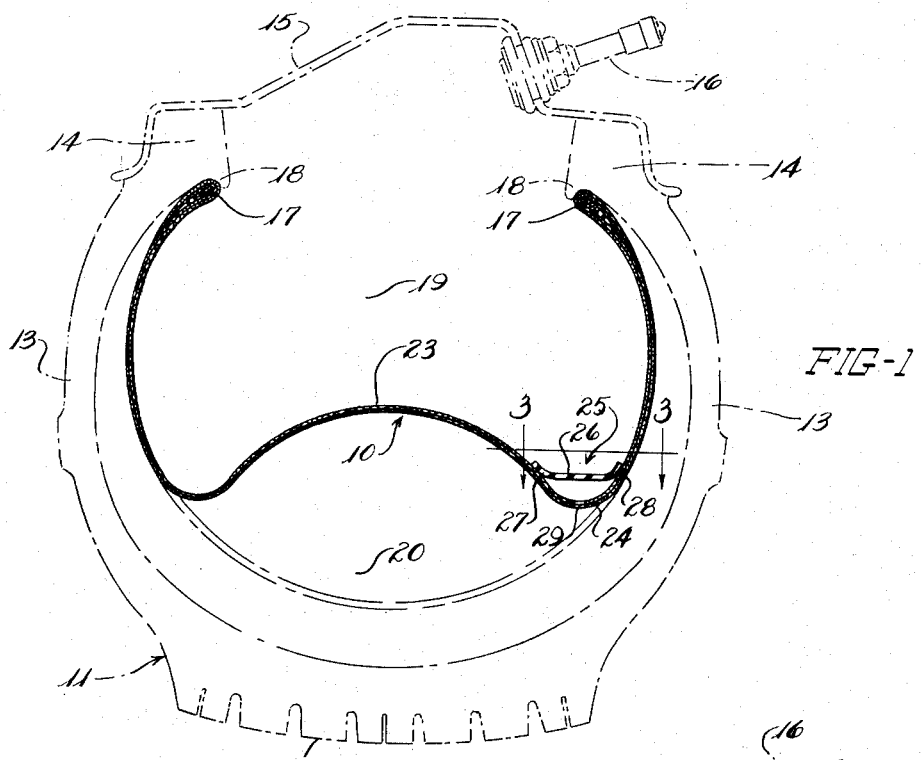
Figure 1 is a transverse sectional view of a tubeless tire having a safety diaphragm with a valve embodying the present invention in its normal position.
Figure 2 is a view corresponding to Figure 1 showing the operation of the valve when a blowout occurs.
Figure 3 is a fragmentary view on an enlarged scale of the diaphragm showing the valve of Figures 1 and 2 in plan view.

The invention is especially adapted for use with a diaphragm 10 having a recessed crown. The diaphragm is mounted within a tire 11 having a tread portion 12, side walls 13 and bead portions 14 mounted on a rim 15. The beads of the tire seat firmly against and have sealing contact with the flanges of the rim so that the tire and rim as an assembly are capable of retaining air under the desired pressures, the air being introduced by an inflation valve 16 secured to the rim as shown.

The safety diaphragm is mounted within the tire by means of inextensible bead portions 17 which seat against the annular shoulders 18 of the tire. It will be noted that the diaphragm divides the tire into an inner chamber 19 and an outer chamber 20. In the event of a blowout with the accompanying sudden loss of pressure within the outer chamber 20, the diaphragm will retain the air within the chamber 19 and act as an emergency load-sustaining member to prevent complete collapse of the tire.

The diaphragm is built up of bias-laid ply material, in a manner similar to the construction of the casing of a tire, the plies being wrapped around and firmly anchored to the wire beads 17. Such a construction imparts flexibility as well as strength to the diaphragm.

The recessed crown, indicated at 23, of the diaphragm normally occupies the position indicated by the solid lines in Figure 1 and in this position creates the shoulders 24 of relatively sharp curvature. If a blowout should occur to release the pressure in chamber 20, the diaphragm 10 will distend, with the crown 23 snapping outwardly to a position shown by dotted lines in Figure 1 and by solid lines in Figure 2. The distended diaphragm 10 will, of course, retain air in the chamber 19 to sustain the load on the tire in the manner indicated in Figure 2.

Communication between the inner and outer chambers 19 and 20 is provided by a valve construction indicated generally at 25 which depends on the curvature of the shoulders 24 for its operation. The valve 25 comprises a strip 26 extending transversely of the diaphragm and secured at its ends 27 and 28 to the dipahragm on opposite sides of one of the shoulders 24. The strip 26 is appreciably shorter than the distance between points 27 and 28 as measured along the diaphragm and is spaced a substantial distance from the bottom of the shoulder and from the aperture 29 located therein.

In the event of a blowout with a sudden release of the pressure in chamber 20, the air in chamber 19 will cause the recessed crown to snap outwardly with the shoulders tending to disappear as such. This position is shown in dotted lines in Figure 1 and in solid lines in Figure 2. It will be noted in Figure 2 that the crown portion of the diaphragm is somewhat flattened at the point which momentarily sustains the load, but the distention is still sufficient to insure the eradication of the shoulders 24. Of course, after a blowout occurs, every other portion of the diaphragm, except that which is bearing the load, assumes the dotted line position of Figure 1.

The distention of the diaphragm as shown in Figure 2 will cause the apertured shoulder portion and the strip 26 to come into close proximity to each other. Once this position of proximity is reached, the strip will flutter shut against the aperture, and then the air pressure within the inner chamber 19 will press the strip firmly against the diaphragm to maintain it in closed position, effectively retaining air within the chamber 19.

The illustration of the invention in the drawings, while perhaps not strictly to scale, does represent fairly accurately the changes in shape in the diaphragm which take place and upon which the valve depends for its operation. Thus, in the normal position of Figure 1, the shoulder portion has a radius of curvature adjacent the aperture of one unit; while in the blowout portion of Figure 2, the same portion has a radius of curvature of about 6 units. Such a great decrease in curvature (increase in radius of curvature) stretches out the strip 26 to bring it closely adjacent the flattened and almost straight shoulder portion as mentioned above. It will be apparent that the strip 26 is elastic so that this stretching can occur.

Various modifications of the invention will be apparent to those skilled in the art without departing from the scope of the invention. For example, the strip 26 need not be elastic, but may have a length approximating that of the apertured shoulder portion. In such case, the strip would be initially disposed so that it bulges away from the shoulder coming into contact with the diaphragm only upon the occurrence of a blowout. The essential features of the invention are summarized in the following claims:

What is claimed is:

1. For use in a tire of the tubeless type, a safety diaphragm having a recessed crown defined by a pair of circumferential annular shoulders, dividing the interior of the tire into an inner chamber and an outer chamber, a valve comprising a flat, elastic strip extending transversely of the diaphragm and secured at its ends to points on either side respectively of one of said shoulders, said strip normally spanning said shoulder in a position overlying an aperture in said shoulder and spaced a substantial distance from said aperture when the air pressures in said chambers are substantially equal, said strip being adapted to lie closely adjacent said aperture to cut off communication between said chambers when the air pressure in said outer chamber is sharply reduced permitting outward distension of said diaphragm crown.

2. In a tubeless tire, the combination of a safety diaphragm normally having a circumferential annular portion which in every transverse section is of relatively sharp outwardly convex curvature as compared with the curvature of immediately adjacent portions and a valve comprising a flat, elastic strip extending transversely across said annular portion in a position overlying an aperture in said portion, said strip being secured at its ends to the diaphragm on either side of said aperture respectively, said diaphragm dividing the interior of the tire into inner and outer chambers and being adapted to distend outwardly whenever the pressure in the outer chamber becomes atmospheric as a result of a blowout whereby the curvature of said annular portion is markedly reduced and said strip is stretched to lie closely adjacent said aperture and cut off communication between said chambers.

3. In a tubeless tire having a safety diaphragm with a recessed crown defined by a pair of circumferential annular shoulders dividing the interior of the tire into an inner chamber and an outer chamber, a valve comprising a flat strip extending transversely of the diaphragm and secured at its ends to points on either side respectively of one of said shoulders, said strip normally spanning said shoulder in a position overlying an aperture in said shoulder and spaced a substantial distance from said aperture when the air pressure in said chambers is equal, said strip being adapted to lie closely adjacent said aperture to cut off communication between said chambers when the air pressure in said outer chamber is sharply reduced permitting outward distension of said diaphragm crown.

4. For use in a pneumatic tire, a safety diaphragm dividing the tire into an inner and an outer chamber, a valve construction comprising a flat strip secured to the diaphragm at two points, said diaphragm having an aperture between said points, the lengths of said strip and diaphragm between the points normally being appreciably different, said points being on opposite sides of a diaphragm portion normally having a radius of curvature substantially smaller than the radius of curvature of the diaphragm in its fully extended position.

RAYMOND J. SLEZAK.

References Cited in the file of this patent

UNITED STATES PATENTS

| Number | Name | Date |
|---|---|---|
| 2,173,065 | Lee | Sept. 12, 1939 |
| 2,207,212 | Arey | July 9, 1940 |

OTHER REFERENCES

Tires Service Station for February 1951, vol. XXXII No. 7, page 36.